United States Patent [19]
Chinh

[11] Patent Number: 5,929,180
[45] Date of Patent: *Jul. 27, 1999

[54] APPARATUS AND PROCESS FOR POLYMERISING OLEFIN IN GAS PHASE

[75] Inventor: Jean-Claude Chinh, Martigues, France

[73] Assignee: BP Chemicals Limited, United Kingdom

[*] Notice: This patent is subject to a terminal disclaimer.

[21] Appl. No.: 08/600,036

[22] Filed: Feb. 12, 1996

[30] Foreign Application Priority Data

Feb. 24, 1995 [FR] France .................................. 95 02446

[51] Int. Cl.⁶ .................................................... C08F 2/34
[52] U.S. Cl. .............................. 526/68; 526/69; 526/70; 526/88; 526/901; 526/348.6; 422/145; 422/233
[58] Field of Search ................................ 526/68, 69, 70, 526/88, 901; 422/145, 233

[56] References Cited

U.S. PATENT DOCUMENTS

| | | | |
|---|---|---|---|
| 4,039,507 | 8/1977 | Paige et al. ........................... | 260/42.46 |
| 4,399,055 | 8/1983 | Matsuura et al. .................... | 252/429 B |
| 4,425,206 | 1/1984 | Hutchinson ......................... | 204/159.18 |
| 5,633,333 | 5/1997 | Chinh .................................... | 526/65 |

FOREIGN PATENT DOCUMENTS

| | | | |
|---|---|---|---|
| 0250169 | 12/1987 | European Pat. Off. ........... | B01J 4/00 |
| 250169 | 12/1987 | European Pat. Off. . | |
| 2164500 | 8/1973 | France . | |

OTHER PUBLICATIONS

Robert H. Perry et al. "Chemical Engineers' Handbook" 5th Edition, pp. 20.71–20.72, 1973.

*Primary Examiner*—David W. Wu
*Attorney, Agent, or Firm*—Brooks Haidt Haffner & Delahunty

[57] ABSTRACT

The present invention relates to a process for continuous gas-phase polymerisation of olefin(s) in a fluidized-bed reactor, comprising drawing off the polymer from the vertical side wall of the reactor into a lock hopper via a draw-off conduit so that all flow of the polymer in the draw-off conduit is produced according to a downward direction forming with a horizontal plane an inclination with an angle A at least equal to the angle of repose β of the polymer and not exceeding 90°. The present invention improves the degree of filling of the lock hopper and reduces the amount of gas drawn off with the polymer.

6 Claims, 5 Drawing Sheets

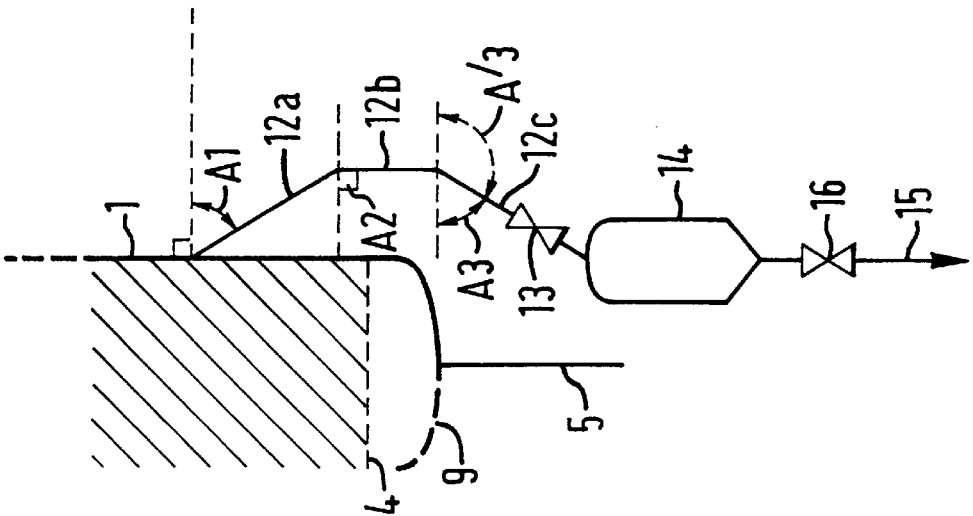
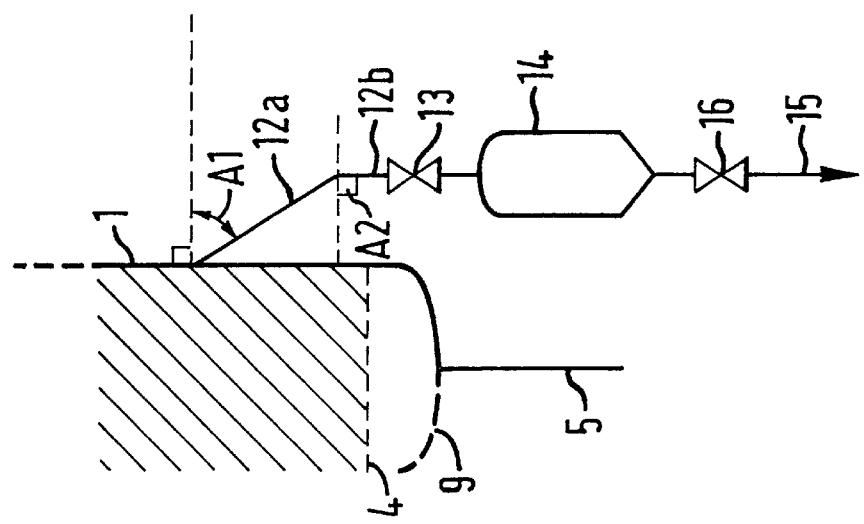
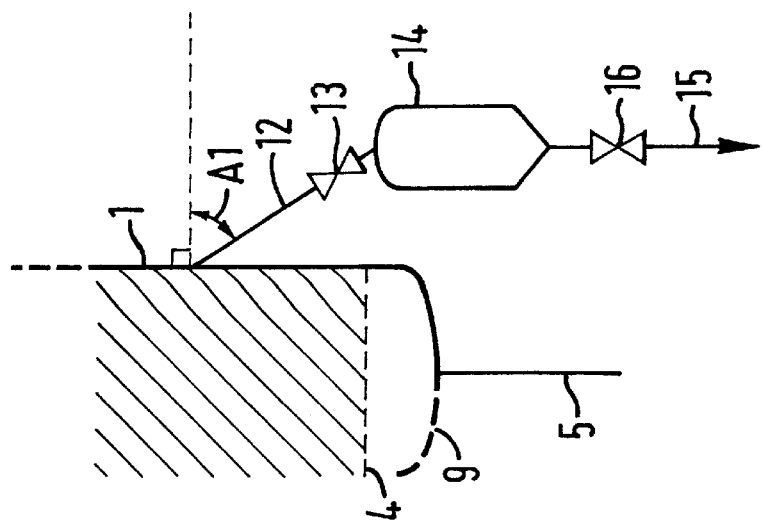

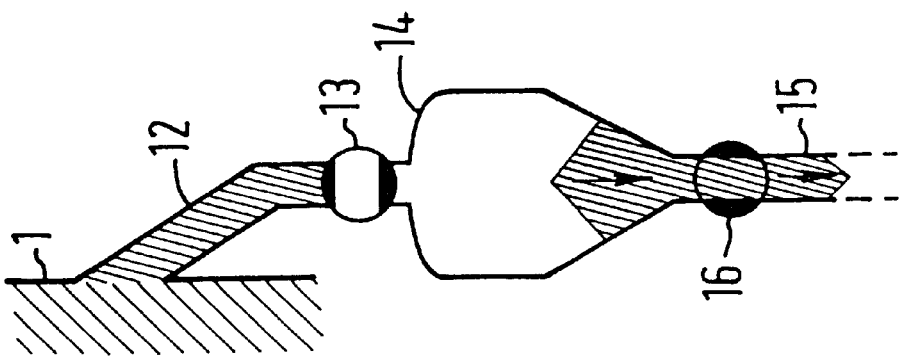
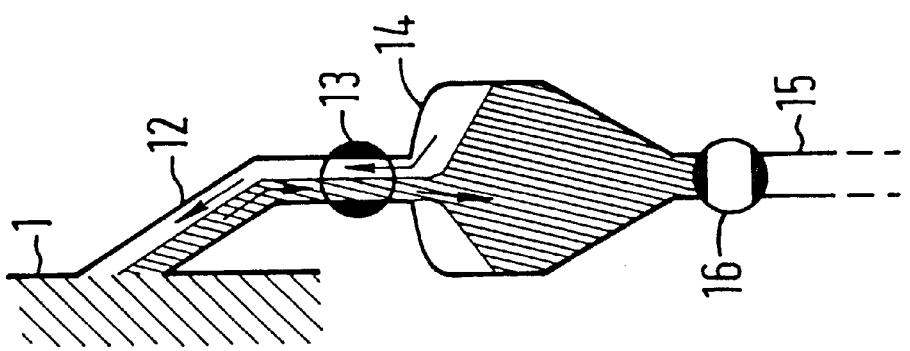
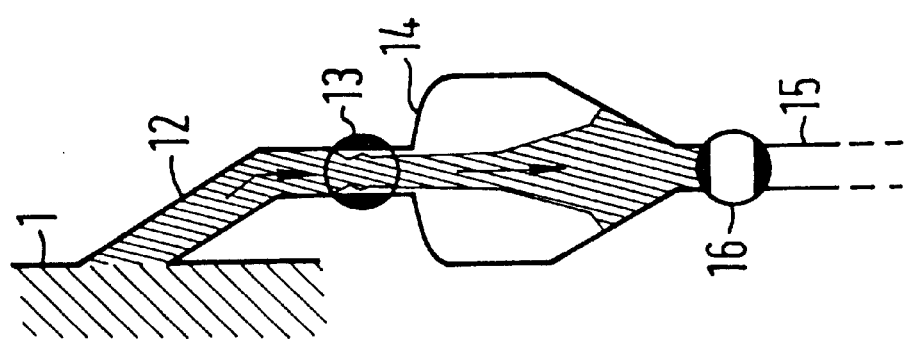
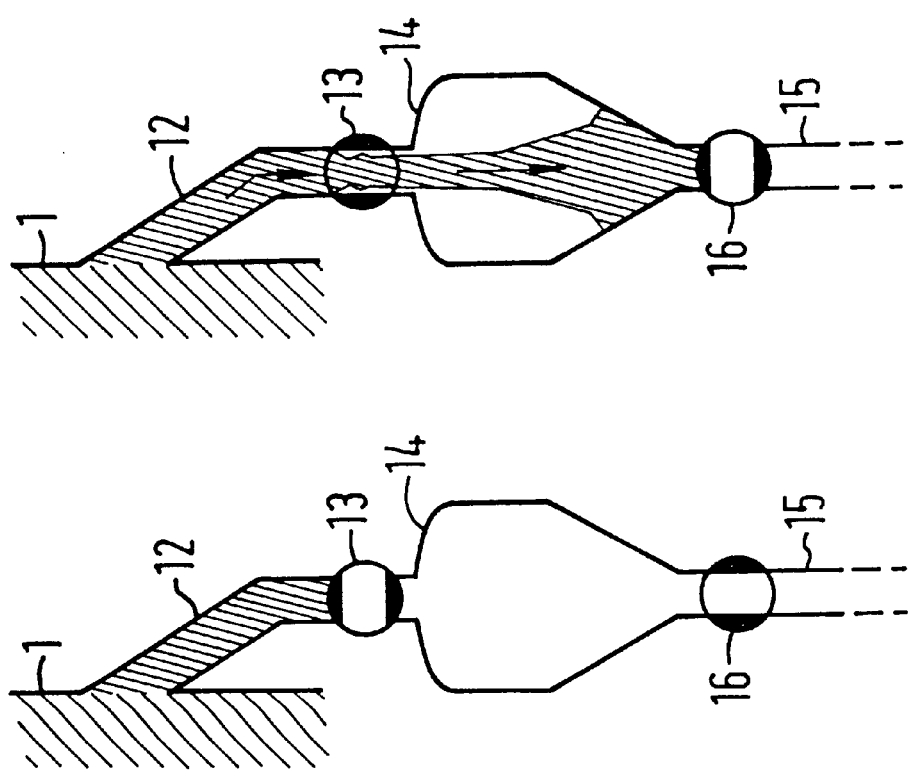

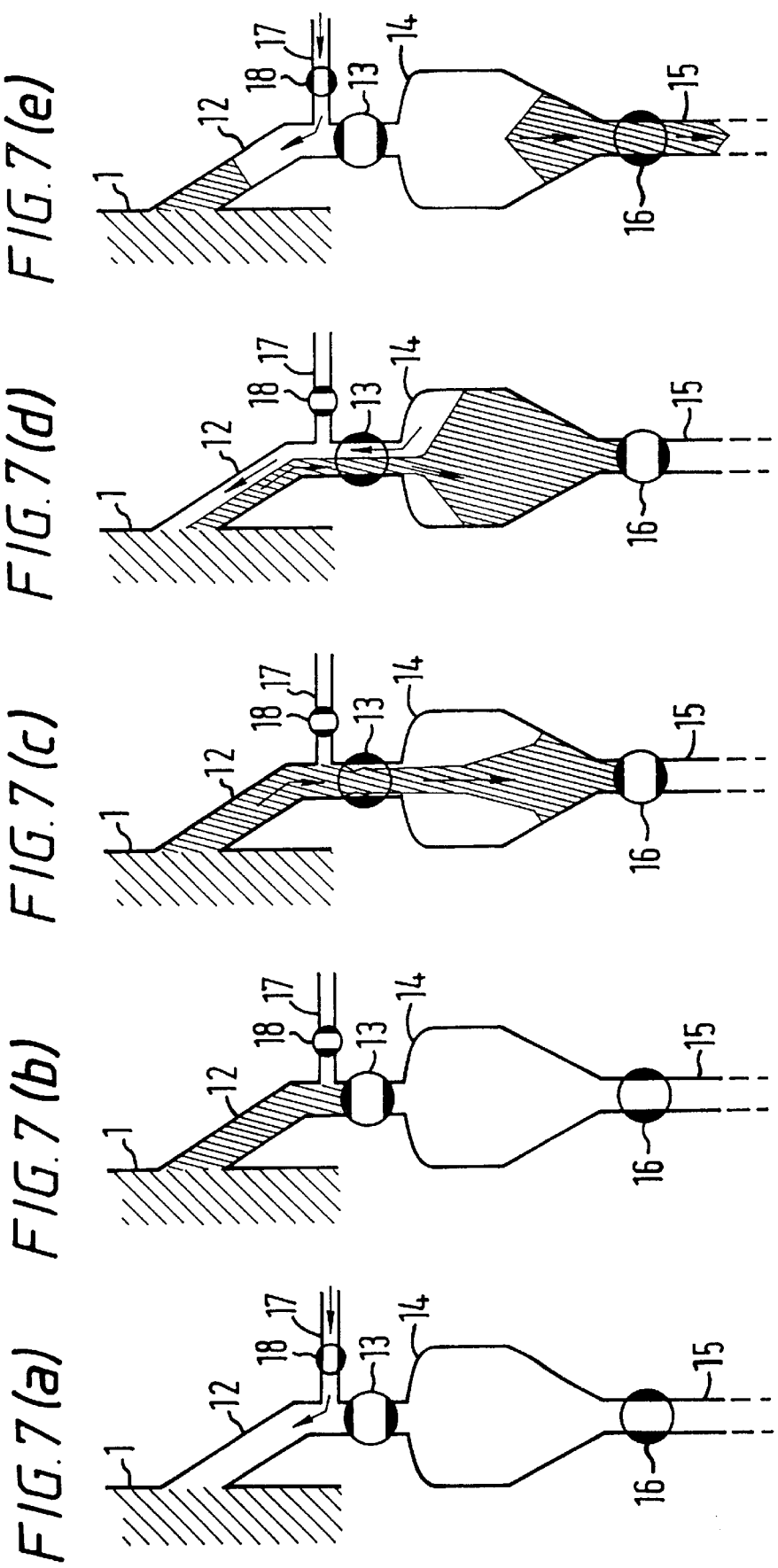

APPARATUS AND PROCESS FOR POLYMERISING OLEFIN IN GAS PHASE

The present invention relates to an apparatus and to a process for gas-phase polymerization of olefin(s) in a fluidized and optionally mechanically stirred bed, particularly with a device improving the drawing off of the polymer manufactured.

It is known to polymerize one or more olefins in the gaseous phase at a pressure which is higher than atmospheric pressure in a reactor with a fluidized bed and a vertical side wall, where polymer particles being formed are kept in the fluidized state above a fluidization grid by virtue of a reaction gas mixture containing the olefin(s) to be polymerized and travelling according to an upward stream. The polymer thus manufactured in powder form is generally drawn off from the reactor by at least one side discharge conduit situated along the vertical wall of the reactor above the fluidization grid and is then subjected to a decompression and degassing stage. The reaction gas mixture leaving via the top of the fluidized-bed reactor is returned to the base of the latter under the fluidization grid through the intermediacy of an external circulation conduit provided with a compressor. While being returned, the reaction gas mixture is generally cooled with the aid of at least one heat exchanger provided in the external circulation conduit so as to remove the heat produced by the polymerization reaction. The polymerization is carried out in the presence of a catalyst or of a catalyst system introduced into the fluidized bed. High-activity catalysts and catalyst systems, which have been known already for a number of years, are capable of producing large quantities of polymer in a relatively short time, thus avoiding a stage of removal of the catalyst residues in the polymer.

When the polymer is drawn from the reactor, it is found to be accompanied by the reaction gas mixture present under pressure in the reactor. It has been observed that the proportion of the reaction gas mixture accompanying the polymer which is drawn off is generally high. This makes it necessary to provide large-sized devices for decompressing and degassing the polymer which is drawn off, and an appropriate and costly device for recovering and recompressing the reaction gas mixture drawn off with the polymer and for recycling most of this gas mixture into the polymerization reactor. Such devices generally include a lock hopper for polymer recovery, connected to the side wall of the fluidized-bed reactor by a draw-off conduit fitted with an isolation valve. The lock hopper may also be connected to a decompression and degassing chamber by a discharge conduit, itself fitted with an isolation valve. In most cases the draw-off conduit leaves the side wall of the reactor in a direction that is perpendicular to the said wall, that is to say in a horizontal plane. It then reaches a lock hopper either while still remaining in the same horizontal plane, as described in U.S. Pat. No. 4,003,712, French Patent No. 2 642 429 or European Patent No. 188 125, or while descending vertically after having formed an elbow, as described in European Patent No. 71 430. The draw-off conduit may also leave the side wall of the reactor while being directed downwards and while forming a relatively small angle with a horizontal plane, for example an angle of 18° as shown in FIG. 1 of French Patent No. 2 599 991, and next reach a lock hopper while descending vertically after having formed an elbow. It has been observed that, in all cases, the proportion of the reaction gas mixture accompanying the polymer which is drawn off is relatively high and results in the above-mentioned disadvantages. To solve this problem, European Patent No. 71 430 proposes to use a separator for polymer recovery comprising a vent conduit system comprising a valve and connecting the said separator to the fluidized-bed reactor at a point situated above the draw-off conduit near to the top of the fluidized bed for venting back to the reactor the gas separated from the polymer in the separator. The same proposal is disclosed in French Patent No. 2 164 500 for drawing off a catalyst from a fluidized bed reactor in a fluidized catalyst cracking (FCC) process. A mixture of fluid and catalyst is drawn from the bottom of the reactor into a separator which is located below the level of the reactor and wherein the fluid is separated from the catalyst and is recycled from the separator into the upper part of the reactor near the top of the fluidized bed via a vent conduit provided with a valve.

An apparatus and a process for gas-phase polymerization of olefin(s) have now been found which make it possible to avoid the above-mentioned disadvantages. In particular, they make it possible to draw off in an extremely simplified and efficient manner a polymer manufactured in a fluidized and optionnaly stirred bed reactor, considerably reducing the proportion of the reaction gas mixture drawn off with the polymer, while avoiding blocking the draw-off system and avoiding using a vent conduit system as disclosed in the above-mentioned Patents.

The subject of the present invention is first of all an apparatus for gas-phase polymerization of olefin(s), comprising a fluidized and optionally mechanically stirred bed reactor with a vertical side wall, provided at its base with a fluidization grid, a conduit for external circulation of a reaction gas mixture connecting the top of the reactor to the base of the latter under the fluidization grid and including a compressor and at least one heat exchanger, and at least one conduit for drawing off polymer provided with an isolation valve and connecting the vertical side wall of the reactor to a lock hopper equipped with a discharge valve, apparatus characterized in that the draw-off conduit leaves the vertical side wall of the reactor while being directed downwards, so that each part of the said conduit forms with a horizontal plane an angle A ranging from 35 to 90°.

BRIEF DESCRIPTION OF THE DRAWINGS

FIGS. 2, 3 and 4 show diagrammatically alternative forms of the draw-off device of the apparatus according to the present invention.

FIG. 6 shows diagrammatically the stages for drawing off the polymer according to the process of the present invention.

FIG. 7 shows diagrammatically the stages for drawing off the polymer according to an alternative form of the process of the present invention.

Figure 1:
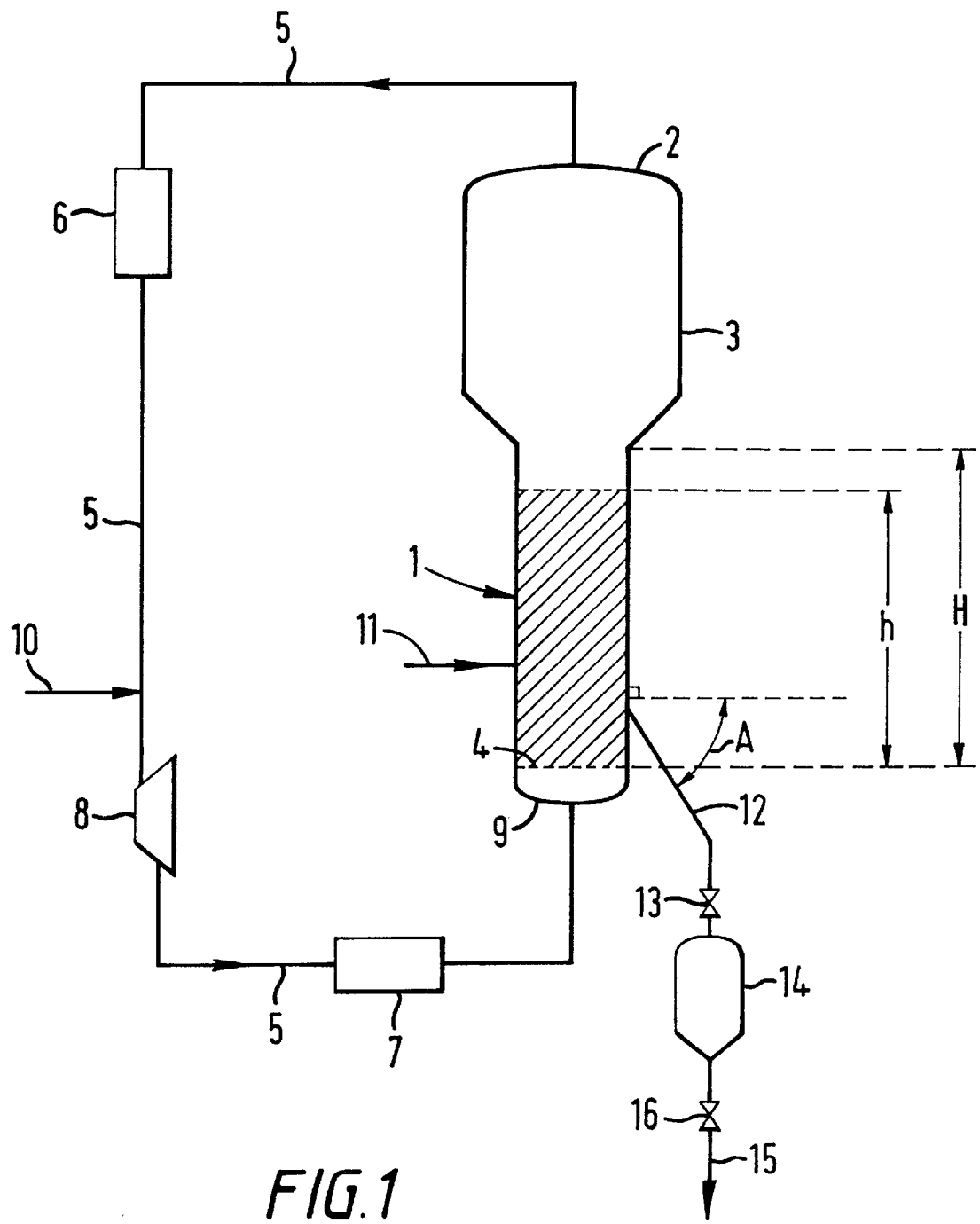
FIG. 1 shows diagrammatically an apparatus for gas-phase olefin polymerization, including particularly the device for drawing off polymer according to the present invention.

The apparatus of the present invention includes particularly a conduit for drawing off polymer, which is directed downwards in order to connect the vertical side wall of the reactor to a lock hopper, and every part of which forms with a horizontal plane an angle A ranging from 35 to 90°, preferably from 40 to 90° and in particular from 45 to 90° or from 50 to 90°. The draw-off conduit thus does not comprise any horizontal portion nor any slightly inclined portion forming with a horizontal plane an angle that is, for example, smaller than 35°.

In the present definition an angle A is intended to mean any acute or right angle that the lengthwise axis of the draw-off conduit forms with a horizontal plane, this applying to every portion of the conduit ranging from the vertical side wall of the reactor to the lock hopper. If a portion of the draw-off conduit (12c) such as shown diagrammatically in FIG. 4 forms an obtuse angle with a horizontal plane, in this case the obtuse angle $A'_3$, it will be considered that, according to the present definition, the angle A shall be the smaller angle, that is to say the acute angle supplementary to the obtuse angle, in this case the acute angle $A_3$, supplementary to the obtuse angle $A'_3$.

The draw-off conduit may consist of a single rectilinear conduit (12) such as shown diagrammatically in FIG. 2, or of a joined succession of two or a number of rectilinear conduits (12a, 12b, 12c) such as are shown diagrammatically in FIGS. 3 and 4, it being possible for the joined part(s) between two rectilinear conduits to be one or more portions of a curved conduit.

At the point of departure where the draw-off conduit leaves the vertical side wall of the reactor, the initial angle A which the conduit forms with a horizontal plane may assume any value such as that mentioned above with the exception of 90°. The initial angle, A, is thus smaller than 90°, preferably not greater than 85° and in particular not greater than 80°. It may assume any value ranging from 35° to a value that is smaller than 90°, preferably ranging from 40 to 85° and in particular from 45 to 80° or from 50 to 80°.

The fluidized bed may occupy the whole of the reactor with a vertical side wall, a reactor which rises to a height H starting from the fluidization grid. In this case the point of departure where the draw-off conduit leaves the vertical side wall of the reactor may be situated at any level of the said wall above the fluidization grid. In practice the fluidized bed generally occupies only a portion of the fluidized-bed reactor, so that the height of the fluidized bed, h, is equal to 0.95'H, preferably 0.90'H and in particular 0.85'H, thus avoiding excessive entrainments of polymer particles out of the reactor. In this case the point of departure of the draw-off conduit may be situated at any level of the vertical side wall of the reactor above the fluidization grid, ranging up to 0.95'H, preferably 0.90'H and in particular 0.85'H. In practice it is preferred that the point of departure should be situated at any level of the vertical side wall of the reactor above the grid, ranging from 0.05'H to 0.95'H, preferably from 0.05'H to 0.90'H and in particular from 0.1'H to 0.85'H.

It is preferred to employ very particularly a draw-off conduit consisting of two joined portions of rectilinear conduit (12a, 12b) such as those shown diagrammatically in FIG. 3. The first portion of the conduit leaves the vertical side wall at an initial angle, A, as described above, preferably ranging from 45 to 75°, and in particular from 50 to 70°. The second portion of the conduit, joined to the first for example by a curved portion, is vertical (A=90°).

The draw-off conduit has an internal diameter that can range from 25 to 200, preferably from 50 to 150 mm, which generally depends on the diameter of the polymer particles to be drawn off from the reactor. The internal diameter is preferably constant from one end to the other of the draw-off conduit. The internal volume of the draw-off conduit ($V_1$) may be between ½ and 1/500, preferably between 1/5 and 1/200, in particular between 1/10 and 1/100 the internal volume of the lock hopper ($V_2$).

The draw-off conduit is provided with an isolation valve which is preferably a valve with a spherical core and in particular a nonrestricted passage, which generally has a flow opening of a diameter that is close to or identical with the internal diameter of the draw-off conduit. The isolation valve is preferably of a fast-opening type operating, for example, at an opening speed of less than 1 or 2 seconds. The isolation valve is preferably situated near the lock hopper, so that the internal volume of the portion of the conduit from the vertical side wall of the reactor to the isolation valve is substantially identical with $V_1$.

The lock hopper is preferably a closed vessel into which the draw-off conduit provided with the isolation valve opens in its upper part, preferably at its top. It may, in particular, comprise in its lower part, preferably in its lowest part, an opening provided with a discharge valve communicating with a decompression and degassing chamber through the intermediacy of a connecting conduit. The internal volume of the lock hopper is preferably between 1/10 and 1/500, in particular between 1/100 and 1/2000 the internal volume of the reactor with the vertical side wall.

One of the advantages of the present invention is that the lock hopper does not need to be provided with a vent conduit system connecting the lock hopper to the upper part of the reactor. Thus, the lock hopper preferably does not comprise any vent conduit connecting the said lock hopper to the upper part of the fluidized and optionally stirred bed reactor near to the top of the bed.

FIG. 1 shows diagrammatically in illustration of the apparatus for gas-phase polymerization of olefin(s) according to the present invention. The apparatus includes:

(i) a cylindrical reactor (1) with a fluidized bed and vertical side wall, provided with a top (2) and a base comprising a fluidization grid (4), (ii) an entry chamber (9) for a reaction gas mixture, situated under the grid (4) and communicating with the reactor (1) through the intermediacy of the grid (4), (iii) a line (11) for introducing a catalyst opening through the side wall of the reactor (1), (iv) an external conduit (5) for circulation of the reaction gas mixture, connecting the top (2) of the reactor to the entry chamber (9) for the reaction gas mixture and including a compressor (8) and at least one heat exchanger (6, 7), and (v) at least one conduit (12) for drawing off polymer, provided with an isolation valve (13), connecting the vertical side wall of the reactor (1) to a lock hopper (14), the conduit (12) leaving the vertical side wall of the reactor (1) while being directed downwards, so that every part of the said conduit forms with a horizontal plane an angle A ranging from 35 to 90°, preferably from 40 to 90°, in particular from 45 to 90° or from 50 to 90°.

In its lower part, the lock hopper (14) preferably comprises a discharge conduit (15) provided with a discharge valve (16) which may be identical with the isolation valve (13).

The reactor (1) may advantageously have above it a calming or disengagement chamber (3) capable of reducing the entrainment of the polymer particles out of the reactor, the top of the chamber (3) forming the top (2) of the reactor.

One or more feed conduits (10) for constituents of the reaction gas mixture, such as one or more olefins, for example ethylene or propylene or $C_4$ to $C_{10}$ alpha-olefins, one or more, preferably unconjugated, dienes, hydrogen, and one or a number of inert gases such as nitrogen or at least one $C_1$ to $C_6$, preferably $C_2$ to $C_5$ alkane, may emerge into the external circulation conduit (5).

FIGS. 2, 3 and 4 show diagrammatically alternative forms of the draw-off device as shown in FIG. 1 and employing the same references. FIG. 2 shows particularly a draw-off conduit (12) consisting of a single rectilinear conduit connecting the vertical side wall of the reactor (1) to the lock hopper (14). In FIG. 3, the draw-off conduit consists of a joined succession of two rectilinear conduits (12a, 12b) which have respectively an angle A1 and a right angle A2. In FIG. 4 the draw-off conduit consists of a joined succession of three rectilinear conduits (12a, 12b, 12c) which have an angle A1, a right angle A2 and an angle A3 respectively.

Figure 5:
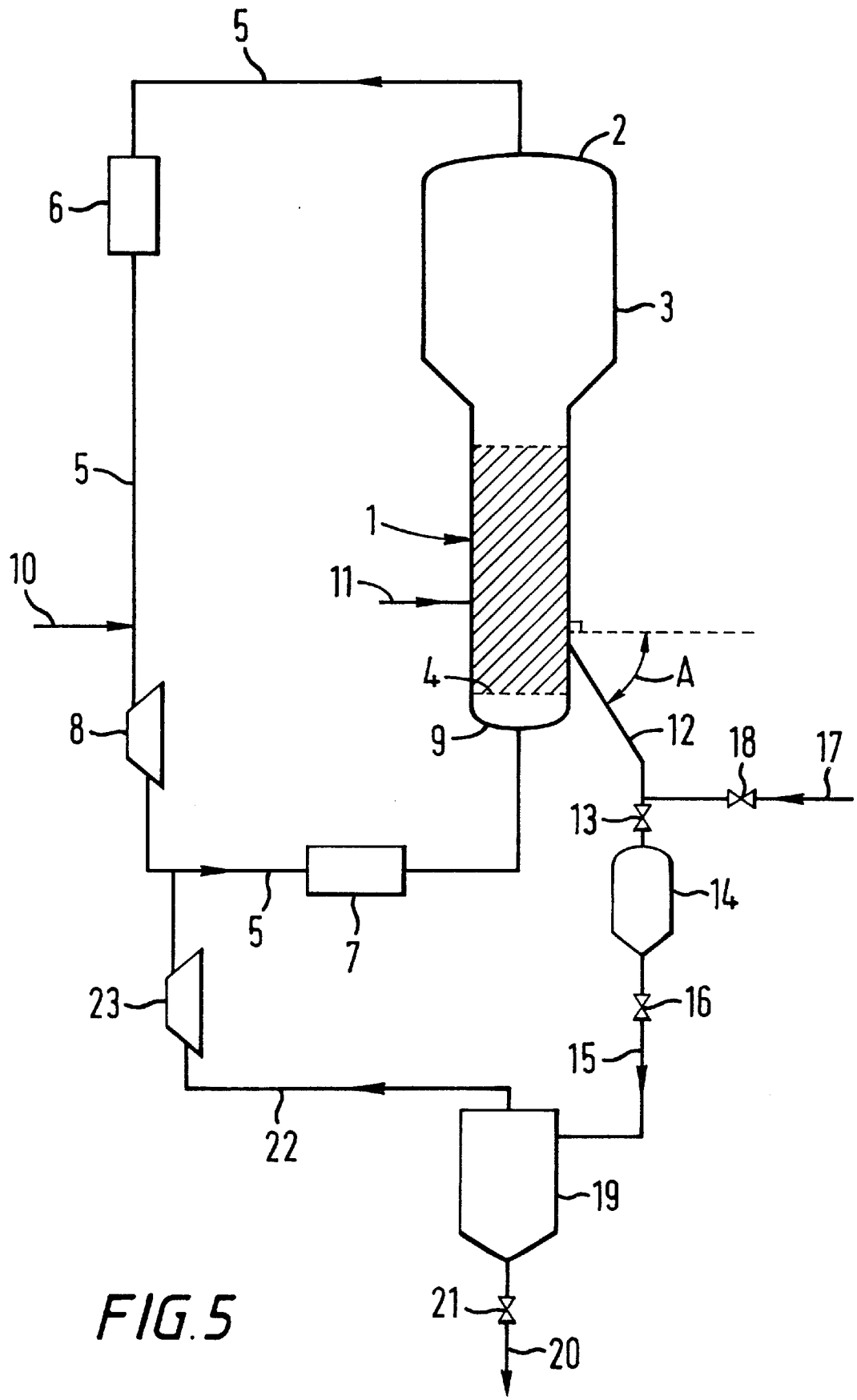
FIG. 5 shows diagrammatically an apparatus which is identical with that shown in FIG. 1 and including some preferred additional devices.

FIG. 5 shows diagrammatically a preferred and improved alternative form of the apparatus as shown in FIG. 1 and employing the same references. It shows particularly a feed conduit (17) for a purging gas, opening into the draw-off conduit (12). The conduit (17) comprises a valve (18) for interrupting the purging. It opens at any point of the conduit (12) situated between the point of departure where the said conduit leaves the vertical side wall of the reactor (1) and the isolation valve (13). It preferably opens near the valve (13) so as to enable the conduit (12) to be purged at will, since the purging gas prevents the deposition and the accumulation of polymer in the said conduit during an excessive period that could result in the partial or complete blocking of the said conduit due to agglomeration and possibly melting of the polymer particles. Since the isolation valve (13) is closed at the time of the opening of the valve (18), the purging gas escapes through the conduit (12) up to the reactor (1).

FIG. 5 shows furthermore an additional device allowing the polymer to be transferred from the lock hopper (14) into a decompression and degassing chamber (19) through the intermediacy of the discharge conduit (15). The chamber (19) is capable of separating the polymer from the reaction gas mixture drawn off with it. The separated polymer is discharged out of the chamber (19) by a conduit (20) preferably provided with a valve (21), in order to be next treated or subjected, for example, to additional degassing, and/or to be stored or granulated. The reaction gas mixture separated off in the chamber (19) is discharged out of the latter and is recycled into the external circulation conduit (5) by virtue of a recycling conduit (22) provided with a compressor (23).

Another subject of the present invention is a process for continuous gas-phase polymerization of olefin(s) in a reactor with a fluidized and optionally mechanically stirred bed and with a vertical side wall at an absolute pressure $P_1$ higher than atmospheric pressure, by continuous or intermittent introduction of a catalyst into the reactor, continuous introduction of olefin(s) into a reaction gas mixture passing continuously through the reactor according to an upward stream and being recycled to the base of the reactor, removal of the heat of polymerization by cooling the recycled reaction gas mixture, and drawing off the polymer manufactured into a lock hopper provided with a discharge valve and connected to the vertical side wall of the reactor by a draw-off conduit equipped with an isolation valve, process characterized in that all flow of the polymer drawn off by, the draw-off conduit from the vertical side wall of the reactor into the lock hopper is produced according to a direction pointing downwards and forming with a horizontal plane an inclination with an angle A at least equal to the angle of repose b of the polymer and not exceeding 90°.

The angle of repose, b, of the polymer is that defined by F. A. Zenz and D. F. Othmer in "Fluidization and Fluid-Particle Systems" published in "Reinhold Chemical Engineering Series" by Reinhold Publishing Corporation, New York, (1960), pages 85 to 88. It is also called "angle of repose a" by the European Handling Federation, Section II, Continuous Handling/Special Characteristics of Bulk Products Transported in Pneumatic Conveyors" (FEM 2, 481), GB edition 1984, pages 9 and 10, and FIG. 2.

The angle of repose b of the polymers manufactured according to the present process, in particular of powders of polyethylene, of polypropylene or of a copolymer of ethylene or of propylene, can generally have a value higher than 30° and lower than 60°, preferably ranging from 35 to 55°, in particular from 40 to 45°.

The process of the invention is very particularly suitable for polyolefin powders, especially of linear low density polyethylene or high density polyethylene, for example of density ranging from 0.87 to 0.97 $g/cm^3$, or of polypropylene. The polymers manufactured according to the present process may particularly be powders corresponding essentially to type B and sometimes to types A and B, according to the classification given by D. Geldart in "Gas Fluidization Technology" published in "Wiley-Interscience Publication" by John-Wiley & Sons (1986), pages 33 to 46. The polymers may consist of particles which have a mass-average diameter ranging from 300 to 2000, preferably from 500 to 1500 mm.

According to the present invention, all flow of the polymer drawn off from the reactor into the lock hopper is produced according to a downward inclination forming with a horizontal plane an angle A that is at least equal to the angle of repose b of the polymer and not exceeding 90°, preferably ranging from b+5° to 90°, in particular from b+10° to 90°. Thus, at no time from its being drawn off from the reactor to the lock hopper will the polymer flow according to a horizontal plane or according to a low inclination forming with a horizontal plane an angle which is, for example, smaller than the angle of repose b of the said polymer.

At the point of departure of the polymer flow, where the polymer leaves the vertical side wall of the reactor in order to flow towards the lock hopper, the angle A of the initial inclination of the flow may assume any value equal to or higher than b, or b+5° or b+10°, but lower than 90°, for example not exceeding 85°, preferably not exceeding 80°. The angle A of the initial inclination of the flow may thus assume any value ranging from b to a value lower than 90°, preferably ranging from b+5° to 85° and in particular from b+10° to 80°.

By virtue of the greatly and perpetually inclined flow type, it has been observed that at the moment of the opening of the isolation valve bringing the reactor into communication with the lock hopper, for example at an initial absolute pressure $P_2$ lower than $P_1$, the discharge valve of the lock hopper being closed, the portion of the draw-off conduit upstream of the isolation valve, that is to say between the reactor and the isolation valve, is substantially filled with polymer which then, under the effect of the pressure difference, flows immediately into the lock hopper according to an essentially dense-phase mode, in a first stage, until an absolute pressure substantially equal to $P_1$ is obtained in the lock hopper, and which next continues in a second stage to flow into the lock hopper according to an essentially gravity mode for a sufficient time to fill the lock hopper with the desired quantity of polymer, the said quantity being next isolated in the lock hopper by closing the isolation valve and recovered out of the lock hopper on opening the discharge valve.

Thus, by virtue of the strong and perpetual inclination of the polymer flow between the reactor and the lock hopper, the portion of the draw-off conduit upstream of the isolation valve is filled with polymer at rest before the opening of the isolation valve, with the result that, when the latter opens, it is essentially polymer in a dense phase that enters the lock hopper during the first stage and not essentially the reaction gas mixture as in the known former processes. In addition, when equalization of the pressure is substantially established between the lock hopper and the reactor, generally in 1 or 2 seconds after the opening of the isolation valve, the strong and perpetual inclination of the polymer flow promotes, in the second stage, an essentially gravity flow mode which remains intense in the draw-off conduit, despite an opposite current of gas escaping from the lock hopper up to the reactor in step with the lock hopper becoming filled with polymer.

The various types of solid flow mode in a gas, for example as dense phase, concurrent or countercurrent, are defined especially by F. A. Zenz and D. F. Othmer in "Fluidization and Fluid-Particle Systems", published in Reinhold Chemical Engineering Series" by Reinhold Publishing Corporation, New York (1960), pages 477 to 487, and by J. F. Davidson and D. Harrison in "Fluidization", published by Academic Press Inc., London (1971), pages 1 to 9.

It has been observed that the mean degree of filling of the lock hopper according to the present invention is improved by at least 20%, preferably by at least 30%, when compared with the known former processes.

It is surprising to find that the process of the invention does not lead to partial or complete blocking of the draw-off conduit when the polymer is particularly at rest in the said conduit just before the opening of the isolation valve and that it flows as dense phase as soon as the said valve is opened, it being known that the polymer drawn off from the reactor contains active catalyst species, that it is still in contact with the uncooted reaction gas mixture and that the polymerization reaction is strongly exothermic.

The polymer may be drawn off according to a cycle of operations which is repeated during the polymerization process in a regular or irregular manner, preferably with the aim of maintaining the bed of the reactor at a substantially constant height in the reactor. By way of example, a cycle of operations is as follows.

At the beginning of the cycle, the isolation and optionally the discharge valves being closed, an absolute pressure $P_2$ prevails in the lock hopper which is empty of polymer, $P_2$ being lower than the reactor pressure $P_1$. The ratio $P_1:P_2$ may range from 5:1 to 50:1, preferably 10:1 to 25:1. The absolute pressure $P_2$ is generally slightly higher than the ambient atmospheric pressure and may, for example, range from 0.11 to 0.2 MPa, preferably from 0.11 to 0.15 MPa.

The cycle may next comprise the opening of the isolation valve, preferably at a high speed, for example in less than 1 or 2 seconds, the discharge valve of the lock hopper being closed. The isolation valve may be kept open for a sufficient time to recover the desired quantity of polymer in the lock hopper, for example for a period of 1 to 120, preferably of 2 to 40, in particular of 3 to 20 seconds. Closing of the isolation valve may take place after an absolute pressure which is substantially equal to the absolute pressure $P_1$ of the reactor has been obtained in the lock hopper. Immediately or very rapidly after the closing of the isolation valve the discharge valve is opened, preferably according to a high speed, for example in less than 1 or 2 seconds, in order to discharge the polymer out of the lock hopper. The polymer may, for example, be discharged into a decompression and degassing chamber (19) through the intermediacy of a conduit (15) such as those shown diagrammatically in FIG.

5. An absolute pressure $P_2$ may prevail in the chamber (19), which may be provided with a valve (21) in closed position at the time of discharging the polymer from the lock hopper into the chamber, with the result that at the end of the cycle an absolute pressure $P_2$ is again encountered in the lock hopper.

The total duration of the cycle, including the discharge of the polymer out of the lock hopper, may, for example, be from 5 to 300, preferably from 8 to 60 seconds. It is preferable that the period separating the end of one cycle from the beginning of the following cycle should be as short as possible, for example from 5 to 300, preferably from 10 to 60 seconds.

If, however, the total duration of a cycle and/or the time separating the end of one cycle from the beginning of the following cycle are too long and create the risk of causing partial or complete blocking of the draw-off conduit, it is preferable to employ a purging gas, for example through the intermediacy of a conduit (17) emerging into the draw-off conduit (12) upstream of the isolation valve (13) and preferably near the said valve, as shown diagrammatically in FIG. 5. The purging gas may be the reaction gas mixture from the reactor preferably cooled, or otherwise, one or more constituents of this mixture, hydrogen, or an inert gas such as nitrogen or, for example, at least one $C_1$ to $C_6$, preferably $C_2$ to $C_5$ alkane, at a pressure higher than $P_1$. The feed conduit (17) for purging gas is provided with a valve (18). The purging gas is introduced into the draw-off conduit upstream of the isolation valve in order to prevent the polymer from stagnating at rest in the said conduit when the isolation valve is closed, its introduction being preferably stopped a sufficient time before the reopening of the isolation valve, so as to leave the polymer the time to fill substantially the draw-off conduit. In the cycle of the drawing-off operations described above by way of illustration the handling of the valve (18) may take place in the following manner. Immediately after the closing of the isolation valve (13) the valve (18) can be opened and can be kept open until the beginning of the following cycle, just before the opening of the isolation valve (13). The valve (18) is preferably closed shortly before the opening of the isolation valve 13), for example from 1 to 30, preferably from 2 to 20 seconds before, so as to fill the draw-off conduit with polymer and consequently to promote a flow of the polymer as dense phase through the said conduit after the opening of the isolation valve (13). The velocity of the purging gas in the draw-off conduit may be such that it is higher than the minimum velocity for fluidization of the polymer, or preferably such that it entrains the polymer out of the draw-off conduit into the reactor.

FIG. 6 shows diagrammatically the stages for drawing off the polymer from the reactor (1) into the lock hopper (14) through the intermediacy of the draw-off conduit (12) and the isolation valve (13). In stage 6a the polymer is fluidized in the reactor (1) at a pressure $P_1$, a portion of the polymer is at rest in the portion of the conduit (12) upstream of the valve (13), the valve (13) is closed, the lock hopper is empty of polymer at a pressure $P_2$ lower than $P_1$ and the valve (16) is open. In stage 6b the valve (16) is closed and the valve (13) is opened, the polymer flows essentially as dense phase through the conduit (12) under the effect e.g. of the pressure difference and pours into the lock hopper (14), while the pressure in the lock hopper rises to $P_1$. In stage 6c the pressure in the lock hopper is equal to $P_1$, the polymer flows according to an essentially gravity mode through the conduit (12) and fills the lock hopper (14), while the gas present in the lock hopper escapes from the latter countercurrent-wise to the polymer through the conduit (12) and returns into the reactor. In stage 6d, the valve (13) is closed, the valve (16) is opened, the polymer present in the lock hopper leaves the latter through the conduit (15) under the effect e.g. of a pressure difference, the pressure in the lock hopper dropping to $P_2$, and fluidized polymer from the reactor (1) enters the portion of the conduit (12) upstream of the valve (13). The following cycle can then recommence.

FIG. 7 shows diagrammatically the stages for drawing off the polymer from the reactor (1) into the lock hopper (14) according to a preferred alternative form employing the same references as in FIG. 6, with, furthermore, a feed conduit (17) for the purging gas and a valve (18).

In stage 7a the polymer is fluidized in the reactor (1) at a pressure $P_1$, the valve (13) is closed, the valve (18) is open, the purging gas moves up the conduit (12) into the reactor and prevents the polymer from entering the conduit (12), the lock hopper (14) is empty of polymer at a pressure $P_2$ lower than $P_1$ and the valve (16) is open. In stage 7b the valve (18) is closed, polymer moves from the reactor (1) into the portion of the conduit (12) upstream of the valve (13), where it rests. In stage 7c the valve (16) is closed, the valve (13) is opened, the polymer flows essentially as dense phase through the conduit (12) under the effect of the pressure difference and fills the lock hopper (14) while the pressure in the lock hopper rises to $P_1$. In stage 7d the pressure in the lock hopper is equal to $P_1$, the polymer flows according to an essentially gravity mode through the conduit (12) and fills the lock hopper (14), while the gas present in the lock hopper escapes from the latter countercurrent-wise to the polymer through the conduit (12) and returns into the reactor. In stage 7e the valve (13) is closed, the valve (16) is opened, the polymer present in the lock hopper leaves the latter through the conduit (15) under the effect e.g. of a pressure difference, the pressure in the lock hopper dropping to $P_2$, and the valve (18) is opened, allowing the purging gas to flush the polymer present in the conduit (12) up to the reactor (1). The following cycle can then commence.

The isolation (13), discharge (16) and purging (18) valves are preferably valves with a spherical core and nonrestricted passage. They can function non-continuously, with in particular a high speed of opening and of closing produced, for example, in less than 1 or 2 seconds. They can also function according to a continuous movement of rotation, as described in French Patent No. 2 599 991.

The process for continuous gas-phase polymerization of olefin(s) is carried out in a reactor with a fluidized and optionally mechanically stirred bed, maintained at an absolute pressure $P_1$ which may range from 0.5 to 6, preferably from 1 to 4 MPa. The temperature of the fluidized bed may be maintained at a value ranging from 30 to 130° C., preferably from 50 to 110° C. A reaction gas mixture passes through the reactor at an upward velocity which may range from 0.3 to 0.8 m/s, preferably 0.4 to 0.7 m/s. The reaction gas mixture may contain one or more olefins, especially $C_2$ to $C_{10}$, preferably $C_2$ to $C_8$, for example ethylene or propylene, or a mixture of ethylene with at least one $C_3$ to $C_{10}$, preferably $C_3$ to $C_8$, olefin, for example propylene, 1-butene, 1-hexene, 4-methyl-1-pentene or 1-octene, and/or also with at least one diene, for example an unconjugated diene. It may also contain hydrogen and/or an inert gas such as nitrogen or, for example, at least one $C_1$ to $C_6$, preferably $C_2$ to $C_5$ alkane. The polymerization process may in particular be carried out according to the process described in PCT Patent Application WO No. 94/28032. It may be carried out in the presence of a catalyst comprising at least one transition metal belonging to groups 4, 5 or 6 of the Periodic Classification of the elements (approved by the Nomenclature Committee of the "American Chemical Society", see "Encyclopedia of Inorganic Chemistry", editor R. Bruce King, published by John Wiley & Sons (1994)). In particular, it is possible to employ a catalyst system of the Ziegler-Natta type including a solid catalyst comprising a compound of a transition metal such as those mentioned above and a cocatalyst comprising an organometallic compound of a metal belonging to groups 1, 2 or 3 of the Periodic Classification of the elements, for example an organoaluminium compound. High-activity catalyst systems have already been known for a number of years and are capable of producing large quantities of polymer in a relatively short time, with the result that it is possible to avoid the stage of removal of the catalyst residues present in the polymer. These high-activity catalyst systems generally include a solid catalyst essentially comprising transition metal, magnesium and halogen atoms. It is also possible to employ a high-activity catalyst comprising essentially a chromium oxide activated by a heat treatment and used in combination with a granular support based on a refractory oxide. The polymerization process is very particularly suitable for being employed with metallocene catalysts such as zirconocene, hafnocene, titanocene or chromocene, or Ziegler catalysts supported on silica for example based on titanium or vanadium. The above-mentioned catalysts or catalyst systems may be employed directly as they are in the fluidized-bed reactor or may be converted beforehand into olefin prepolymer, in particular during a prepolymerization bringing the catalyst or catalyst system into contact with one or more olefins such as those mentioned above, in a hydrocarbon liquid medium or in gaseous phase, for example according to a non- continuous or continuous process.

The process is very particularly suitable for manufacturing polyolefins in powder form, in particular linear low density polyethylene or high density polyethylene of density ranging, for example, from 0.87 to 0.97 g/cm$^3$, or polypropylene or copolymers of propylene with ethylene and/or $C_4$ to $C_8$ olefins or elastomeric copolymers of propylene with ethylene and optionally at least one unconjugated diene with a density ranging, for example, from 0.85 to 0.87 g/cm$^3$.

The advantages of the apparatus and of the process according to the invention consist in remarkably increasing the degree of filling of the lock hopper with polymer in each drawing-off operation, while avoiding the partial or complete blocking of the draw-off device. The degree of filling may, in particular, be characterized by the weight quantity of polymer which is transferred at each operation of drawing off from the reactor into the lock hopper, a quantity expressed per unit of internal volume of the lock hopper: this quantity is relatively large and may range from 200 to 450, preferably from 250 to 400, in particular from 300 to 400 kg/m$^3$, it being known that these values depend greatly on the bulk density of the polymer at rest.

The following examples illustrate the present invention.

EXAMPLE 1

A gas-phase copolymerization of ethylene with 1-butene is carried out in apparatus which is identical with that shown diagrammatically in FIG. 1. A cylindrical reactor (1) with a fluidized bed and a vertical side wall has an internal diameter of 3 m and a height H of 10 m and has a calming chamber (3) above it. At its base, the reactor has a fluidization grid (4) above which there is fluidized a bed of 18 tons of copolymer of ethylene and of 1-butene with density of 0.96 g/cm$^3$, in the form of a powder consisting of particles which have a mass-average diameter of 750 mm, 90% by weight of the particles having a diameter ranging from 300 to 1200 mm. The bulk density of the fluidized powder is 300 kg/m$^3$. The height h of the fluidized bed is 8.5 m.

The reaction gas mixture passes through the fluidized bed at an absolute pressure of 2 MPa at an upward velocity of 0.6 m/s and at a temperature of 92° C. It contains, by volume, 30% of ethylene, 1% of 1-butene, 25% of hydrogen and 44% of nitrogen.

A catalyst of Ziegler-Natta type comprising titanium, magnesium and halogen atoms is prepared in the form of a prepolymer in a manner which is identical with Example 1 of French Patent No. 2 405 961. It is introduced intermittently into the reactor via the entry line (11).

In these conditions 3.8 tons/hour of copolymer of ethylene and of 1-butene are manufactured in the form of a powder which has the above-mentioned characteristics and in particular an angle of repose, b, equal to 42°.

The device for drawing off the copolymer comprises a draw-off conduit (12) as shown in FIG. 1, which has a length of 1 m and an internal diameter of 0.05 m. The conduit (12) leaves the vertical side wall of the reactor (1) at a height of 1.5 m above the fluidization grid (4) in a downward direction with an initial angle, A, of 60°. Midway along its length it forms an elbow and is then directed vertically (A=90°) downwards. At its lower end it has an isolation valve (13) with a spherical core and nonrestricted passage of 0.05 m internal diameter, before emerging into a lock hopper (14) of 105 litres internal volume, $V_2$. In the lower part of the lock hopper (14) there is an exit orifice provided with a discharge valve (16) communicating with a discharge conduit (15) of 0.05 m internal diameter, connected to a decompression and degassing chamber (19) provided with a recycling conduit (22) and a compressor (23) as well as a conduit (20) and a valve (21), such as those shown diagrammatically in FIG. 5.

The copolymer is drawn off from the reactor (1) according to a cycle of operations as shown in FIG. 6, including the following stages:

the valve (13) is closed, the lock hopper (14) is empty of copolymer at an absolute pressure $P_2$ of 0.12 MPa, the valve (16) is open and the conduit (12) upstream of the valve (13) is full of copolymer at rest;

the valve (16) is closed and the valve (13) is opened in approximately 1 second; the copolymer flows essentially as dense phase through the conduit (12) and pours into the lock hopper (14) while the absolute pressure in the lock hopper rises in less than 2 seconds from 0.12 to 2 MPa; the copolymer continues to flow into the lock hopper (14) at an absolute pressure of 2 MPa according to an essentially gravity mode, while the gas present in the lock hopper escapes countercurrent-wise to the copolymer through the conduit (12) and returns into the reactor (1);

the valve (13) is kept open for 8 seconds;

the valve (13) is closed and the valve (16) is opened in approximately 1 second; the copolymer leaves the lock hopper (14) and flows through the conduit (15) into the chamber (19) in approximately 3 seconds, while the absolute pressure in the lock hopper decreases rapidly from 2 to 0.12 MPa and while copolymer enters from the reactor (1) into the conduit (12), where it rests.

The cycle of the operations is repeated every 30 seconds. At each cycle the quantity of copolymer drawn off from the reactor through the intermediacy of the lock hopper is 32 kg. The degree of filling of the lock hopper (14) with copolymer is 305 kg per m$^3$ of the internal volume of the lock hopper.

The copolymerization process takes place in this way for several days without blocking of the draw-off device.

EXAMPLE 2

A copolymerization is carried out which is identical with that of Example 1, except for the fact that the apparatus employed is that shown diagrammatically in FIG. 5. Furthermore, the cylindrical reactor (1) has an internal diameter of 4.5 m and a height H of 16 m, and a bed of 70 tons of a copolymer of ethylene and of 1-butene identical with that of Example 1 is fluidized. The height h of the fluidized bed is 14 m. The absolute pressure $P_1$ of the reactor is 2.3 MPa. A purging gas feed conduit (17) provided with a valve (18) emerges into the conduit (12) just above the valve (13). In these conditions 17.3 tons of copolymer are manufactured per hour.

The device for drawing off the copolymer is identical with that of Example 1, except for the fact that the internal diameter of the conduit (12) and of the valve (13) is 0.075 m, the conduit (12) leaves the vertical side wall of the reactor (1) at a height of 1 m above the grid (4), the internal volume ($V_2$) of the lock hopper (14) is 200 litres, the internal diameter of the conduit (15) is 0.0625 m, and that two devices of this type are installed in parallel for drawing off the copolymer.

The copolymer is drawn off from the reactor (1) with the aid of the two draw-off devices according to a cycle of operations as shown in FIG. 7, including the following stages for each of the two devices:

the valve (13) is closed, the valve (18) is open and allows a reaction gas mixture which is identical with that in the reactor (1) to pass through, at a temperature of 92° C. at an absolute pressure of 2.4 MPa, travelling at a velocity of 0.6 m/s in the conduit (12) up to the reactor (1), preventing the copolymer from stagnating at rest in the conduit (12); the lock hopper (14) is empty of polymer at an absolute pressure of 0.12 MPa and the valve (16) is open;

the valve (18) is closed, fluidized copolymer enters the conduit (12) upstream of the valve (13), where it rests;

8 seconds later the valve (16) is closed and the valve (13) is opened in approximately 1 second; the copolymer flows essentially as dense phase through the conduit (12) and pours into the lock hopper (14) while the absolute pressure in the lock hopper rises from 0.12 to 2 MPa in approximately 2 seconds; the copolymer continues to flow into the lock hopper (14) at an absolute pressure of 2 MPa according to an essentially gravity mode, while the gas present in the lock hopper escapes countercurrent-wise to the copolymer through the conduit (12) up to the reactor (1);

the valve (13) is kept open for 10 seconds;

the valve (13) is closed and the valves (16) and (18) are opened in approximately 1 second; the copolymer leaves the lock hopper (14) and flows through the conduit (15) into the chamber (19) in less than approximately 4 seconds, while the absolute pressure in the lock hopper decreases rapidly from 2 to 0.12 MPa, and while the copolymer present in the conduit (12) is flushed from the latter into the reactor (1) by the purging gas.

The cycle of the operations is repeated every 25 seconds for each of the draw-off devices. At each cycle the quantity of copolymer drawn off from the reactor through the intermediacy of each device is 60 kg. The degree of filling of the lock hopper (14) with copolymer is 300 kg per m$^3$ of internal volume of the lock hopper.

The copolymerization process takes place in this way for several days without blocking of the draw-off devices.

EXAMPLE 3 (comparative)

The operation is performed exactly as in Example 1, except for the fact that the first portion of the conduit (12) has an angle A of 18° instead of 60°.

It is found that in each cycle of the draw-off operations the quantity of copolymer drawn off is 30% smaller than in Example 1. The low degree of filling of the lock hopper (14) is due to the fact that before the opening of the valve (13) the portion of the conduit (12) upstream of the valve (13) contains very little copolymer and that, when the valve (13) is opened, it is essentially the reaction gas mixture that passes through the conduit (12) and enters the lock hopper (14). Furthermore, when the pressure equilibrium is obtained between the lock hopper and the reactor, the flow of the copolymer through the conduit (12) takes place slowly and finally there is relatively little filling of the lock hopper (14) with copolymer. As a result the cycle of the operations for drawing off the copolymer is repeated more frequently than in Example 1, in order to ensure an equivalent hourly output and a constant bed height in the reactor. It is observed, moreover, that the compressor (23) intended to recycle into the conduit (5) through the intermediacy of the conduit (22) the reaction gas mixture accompanying the copolymer which has been drawn off and separated from the latter in the chamber (19) is subjected to markedly more intensive work than in Example 1 in order to ensure the recycling of a much larger volume of gas.

I claim:

1. Process for continuous gas-phase polymerization of olefin(s) in a reactor with a fluidized bed and a vertical side wall at an absolute pressure $P_1$ higher than atmospheric pressure, by continuous or intermittent introduction of a catalyst into the reactor, continuous introduction of olefin(s) into a reaction gas mixture passing continuously through the reactor according to an upward stream and being recycled to the base of the reactors, removal of the heat of polymerization by cooling the recycled reaction gas mixture, and drawing off the polymer manufactured into a lock hopper provided with a discharge valve and connected to the vertical side wall of the reactor by a draw-off conduit equipped with an isolation valve, process characterized in that all flow of the polymer drawn off by the draw-off conduit from the vertical side wall of the reactor into the lock hopper is produced according to a direction pointing downwards forming with a horizontal plane an inclination with an angle A at least equal to 35° and at least equal to the angle of repose b of the polymer and not exceeding 90°.

2. Process according to claim 1, characterized in that at the moment of the opening of the isolation valve bringing the reactor into communication with the lock hopper at an initial absolute pressure $P_2$ lower than $P_1$, the discharge valve of the lock hopper being closed, the portion of the draw-off conduit included between the reactor and the isolation valve is substantially filled with polymer which then under the effect of the pressure difference immediately flows into the lock hopper according to an essentially dense-phase mode, in a first stage until an absolute pressure substantially equal to $P_1$ is obtained in the lock hopper, and which next continues in a second stage to flow into the lock hopper according to an essentially gravity mode for a sufficient time to fill the lock hopper with the desired quantity of polymer, the said quantity being next isolated in the lock hopper by closing the isolation valve and recovered out of the lock hopper by opening the discharge valve.

3. Process according to claim 2, characterized in that the absolute pressures $P_1$ and $P_2$ are such that the ratio $P_1:P_2$ is from 5:1 to 50:1.

4. Process according to claim 1 or 2, characterized in that a purging gas is introduced into the draw-off conduit upstream of the isolation valve in order to prevent the polymer from stagnating in the said conduit when the isolation valve is closed, its introduction being stopped a sufficient time before the reopening of the said valve, so as to leave the polymer the time to fill substantially the draw-off conduit.

5. Process according to any one of claims 1 to 3, characterized in that ethylene, propylene or ethylene with at least one $C_3$ to $C_{10}$ olefin and/or with a diene is polymerized at an absolute pressure $P_1$ of 0.5 to 6 MPa, at a temperature of 30 to 130° C.

6. A process according to claims 1, 2 or 3 wherein the angle A is from 45 to 75°.

* * * * *